United States Patent
Monajemi et al.

(10) Patent No.: US 11,445,463 B2
(45) Date of Patent: Sep. 13, 2022

(54) REMOVING CLIENT DEVICES FROM ASSOCIATION WITH A WIRELESS ACCESS POINT

(71) Applicant: Cisco Technology, Inc., San Jose, CA (US)

(72) Inventors: Pooya Monajemi, Irvine, CA (US); Ahmadreza Hedayat, Allen, TX (US); Allen J. Huotari, Garden Grove, CA (US); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 462 days.

(21) Appl. No.: 16/150,947

(22) Filed: Oct. 3, 2018

(65) Prior Publication Data

US 2019/0037519 A1    Jan. 31, 2019

Related U.S. Application Data

(63) Continuation of application No. 14/495,954, filed on Sep. 25, 2014, now Pat. No. 10,165,540.

(51) Int. Cl.
*H04W 60/06* (2009.01)
*H04W 84/12* (2009.01)

(52) U.S. Cl.
CPC .......... *H04W 60/06* (2013.01); *H04W 84/12* (2013.01)

(58) Field of Classification Search
CPC ...... H04W 36/08; H04W 36/30; H04W 48/20
See application file for complete search history.

(56) References Cited

U.S. PATENT DOCUMENTS

| | | | |
|---|---|---|---|
| 7,117,018 B2 | 10/2006 | Lewis | |
| 7,424,268 B2 | 9/2008 | Diener et al. | |
| 7,561,904 B2 | 7/2009 | Lagnado | |
| 7,680,457 B2 | 3/2010 | Jin et al. | |
| 8,000,418 B2 | 8/2011 | Jin | |
| 8,059,744 B2 | 11/2011 | Jin et al. | |
| 8,134,503 B2 | 3/2012 | Na et al. | |
| 8,254,845 B2 | 8/2012 | Na et al. | |
| 8,295,384 B2 | 10/2012 | Stager et al. | |
| 2007/0099571 A1 | 5/2007 | Withers et al. | |
| 2008/0051100 A1 | 2/2008 | Kruys et al. | |
| 2009/0113052 A1 | 4/2009 | Doshi et al. | |
| 2010/0118830 A1 | 5/2010 | Stephenson et al. | |
| 2010/0246461 A1 | 9/2010 | Hsieh et al. | |

(Continued)

OTHER PUBLICATIONS

Nikolaidis, et al., "Cone of Silence: Adaptively Nulling Interferers in Wireless Networks," UCL Department of Computer Science, Research Note RN/10/02, Jan. 30, 2010, pp. 1-14.

(Continued)

*Primary Examiner* — Romani Ohri
(74) *Attorney, Agent, or Firm* — Edell, Shapiro & Finnan, LLC (57) ABSTRACT

A wireless access point that serves one or more wireless client devices in a wireless network determines that at least one particular client device that is associated to the wireless access point should not be associated to the wireless access point. The wireless access point transmits frames so that they are received at the particular client device with reduced strength so as to provoke the particular client device to transition from the wireless access point.

20 Claims, 11 Drawing Sheets

(56) References Cited

U.S. PATENT DOCUMENTS

| | | | |
|---|---|---|---|
| 2011/0002295 A1 | 1/2011 | Ghosal et al. | |
| 2011/0012787 A1 | 1/2011 | Na et al. | |
| 2011/0026441 A1 | 2/2011 | Diener et al. | |
| 2011/0026630 A1 | 2/2011 | Stager et al. | |
| 2011/0306297 A1 | 12/2011 | Chang et al. | |
| 2012/0034874 A1 | 2/2012 | Yiu et al. | |
| 2012/0087332 A1 | 4/2012 | Kim et al. | |
| 2012/0122502 A1 | 5/2012 | Shin et al. | |
| 2012/0214403 A1 | 8/2012 | Shany et al. | |
| 2012/0264388 A1 | 10/2012 | Guo et al. | |
| 2013/0012134 A1 | 1/2013 | Jin et al. | |
| 2013/0028158 A1 | 1/2013 | Lee et al. | |
| 2013/0044703 A1 | 2/2013 | Trainin | |
| 2013/0064175 A1 | 3/2013 | Pandey et al. | |
| 2013/0077505 A1 | 3/2013 | Choudhary et al. | |
| 2013/0215938 A1 | 8/2013 | Hansen et al. | |
| 2013/0259015 A1* | 10/2013 | Fujii | H04W 84/18 370/338 |
| 2013/0272269 A1* | 10/2013 | Srivastava | H04W 36/30 370/332 |
| 2013/0329619 A1 | 12/2013 | Carty et al. | |
| 2014/0059218 A1* | 2/2014 | Ganu | H04B 17/318 709/224 |
| 2014/0098681 A1 | 4/2014 | Stager et al. | |
| 2014/0171069 A1 | 6/2014 | Pang et al. | |
| 2014/0313080 A1* | 10/2014 | Smith | H01Q 3/00 342/372 |
| 2015/0098392 A1 | 4/2015 | Homchaudhuri et al. | |
| 2015/0295629 A1* | 10/2015 | Xia | H04B 7/0491 370/329 |
| 2015/0312830 A1* | 10/2015 | Xu | H04W 36/30 370/331 |
| 2015/0319657 A1 | 11/2015 | Fan | |
| 2016/0095079 A1 | 3/2016 | Monajemi et al. | |

OTHER PUBLICATIONS

Badman, "Aruba's 802.11ac Rollout Cleans Up Sticky Clients", Network Computing, http://www.networkcomputing.com/wireless-infrastructure/arubas-80211ac-rollout-cleans-up-sticky-clients/a/d-id/1234209, May 21, 2013, 2 Pages.

* cited by examiner

REMOVING CLIENT DEVICES FROM ASSOCIATION WITH A WIRELESS ACCESS POINT

CROSS REFERENCE TO RELATED APPLICATION

This application is a continuation of U.S. application Ser. No. 14/495,954, filed Sep. 25, 2014, the entirety of which is incorporated herein by reference.

TECHNICAL FIELD

The present disclosure relates to wireless communications, such as wireless local area networks.

BACKGROUND

In wireless local area network (WLAN) deployments, "sticky" clients are those clients that stay associated with an access point (AP) even though there are one or more other APs with a better link quality available to the client. When a client stays associated to an AP when it should not, this causes lower link quality, and also causes airtime usage for the client to be longer than average airtime usage, thus wasting WLAN airtime.

The reason for sticky client behavior is the diverse roaming algorithms that are implemented by different vendors of client devices. This behavior could be due to a variety of factors including that the client device does not search for beacons from APs other than the AP to which it is associated unless the quality of the link reduces to a very low level, that the client device tends to avoid disruption on active connections, and/or other factors.

In enterprise WLAN design and deployments, reducing the number of sticky clients is important to maintain overall network performance.

DESCRIPTION OF EXAMPLE EMBODIMENTS

Overview

In one embodiment, a wireless access point that serves one or more wireless client devices in a wireless network determines that at least one particular client device that is associated to the wireless access point should not be associated to the wireless access point. The wireless access point transmits frames so that they are received at the particular client device with reduced strength so as to provoke the particular client device to transition from the wireless access point.

Example Embodiments

Figure 1:
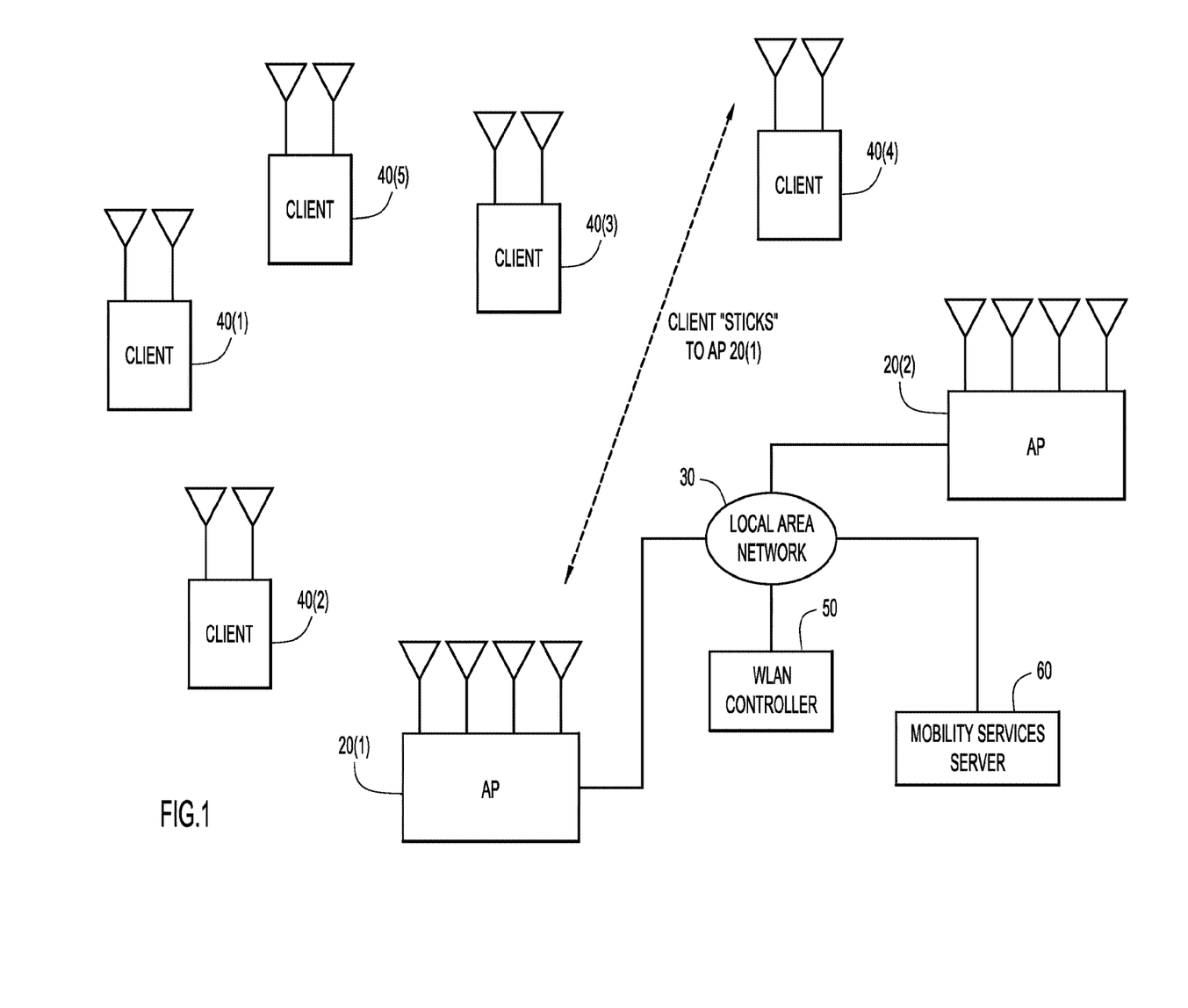
FIG. 1 is a block diagram of a wireless network environment in which one or more wireless access points are configured to perform one or more methods to provoke a wireless client device to transition to a different wireless access point.

Reference is first made to FIG. 1. FIG. 1 shows a network environment 10 that supports wireless network capability, such as a Wi-Fi® wireless local area network (WLAN). To this end, there are multiple wireless access points (APs), two of which are shown as an example at reference numerals 20(1) and 20(2). The APs 20(1) and 20(2) support WLAN connectivity for multiple wireless client devices (also called "clients" herein) shown at reference numerals 40(1)-40(5). It should be understood that FIG. 1 is only a simplified example. There may be numerous more (or less) clients in a real network deployment.

There is back-end infrastructure that is used for control and other functions of the WLAN. Specifically, the APs 20(1) and 20(2) connect to a wired local area network 30 to which are also connected a WLAN controller 50 and a mobility services server 60. The WLAN controller 50 performs control functions for the APs 20(1) and 20(2) and clients 40(1)-40(5) as described further hereinafter. In addition, and as described in more detail hereinafter, the mobility services server 60 performs, among other things, location functions to track the locations of clients based on data gathered from signals received at multiple APs (or other wireless devices at fixed locations). The WLAN controller 50 and mobility services server 60 may reside on the same physical apparatus, or may be applications running on a data center. Thus, both the WLAN controller 50 and mobility services server 60 are not required in order to performance the techniques presented herein.

FIG. 1 also shows that client 40(4) is associated to AP 20(1), but is "sticky" in that it should not be associated to AP 20(1) due to low signal-to-noise ratio (SNR) conditions for the wireless channel between AP 20(1) and client 40(4). However, client 40(4) is stuck to AP 20(1) because it does not scan (passively or actively) for other APs in order to transition to and associate to another AP, such as AP 20(2), for any reason.

Existing methods in dealing with sticky clients include the serving AP not responding to a client that is identified as a sticky client, and de-authenticating the sticky client. These methods can cause disruption in the service and still permit the client to stay with its current AP at the cost of lower service quality.

Presented herein are multiple techniques to remove a sticky client. The reason for multiple methods is that clients might have different algorithms for initiating a roaming process to associate to a different AP. Some clients only evaluate the beacon from its associated AP to decide whether or not to roam, while some clients might also include the receive signal strength indication/information (RSSI) reading that the client generates from received unicast frames. The most efficient method ultimately depends on the roaming algorithm that is used by client vendors. For instance, some Wi-Fi devices that use a particular Wi-Fi chip-set, start a roaming process when the basic service set (BSS) is lost, which can be defined as when a certain number of consecutive beacons are missed.

Figure 2:
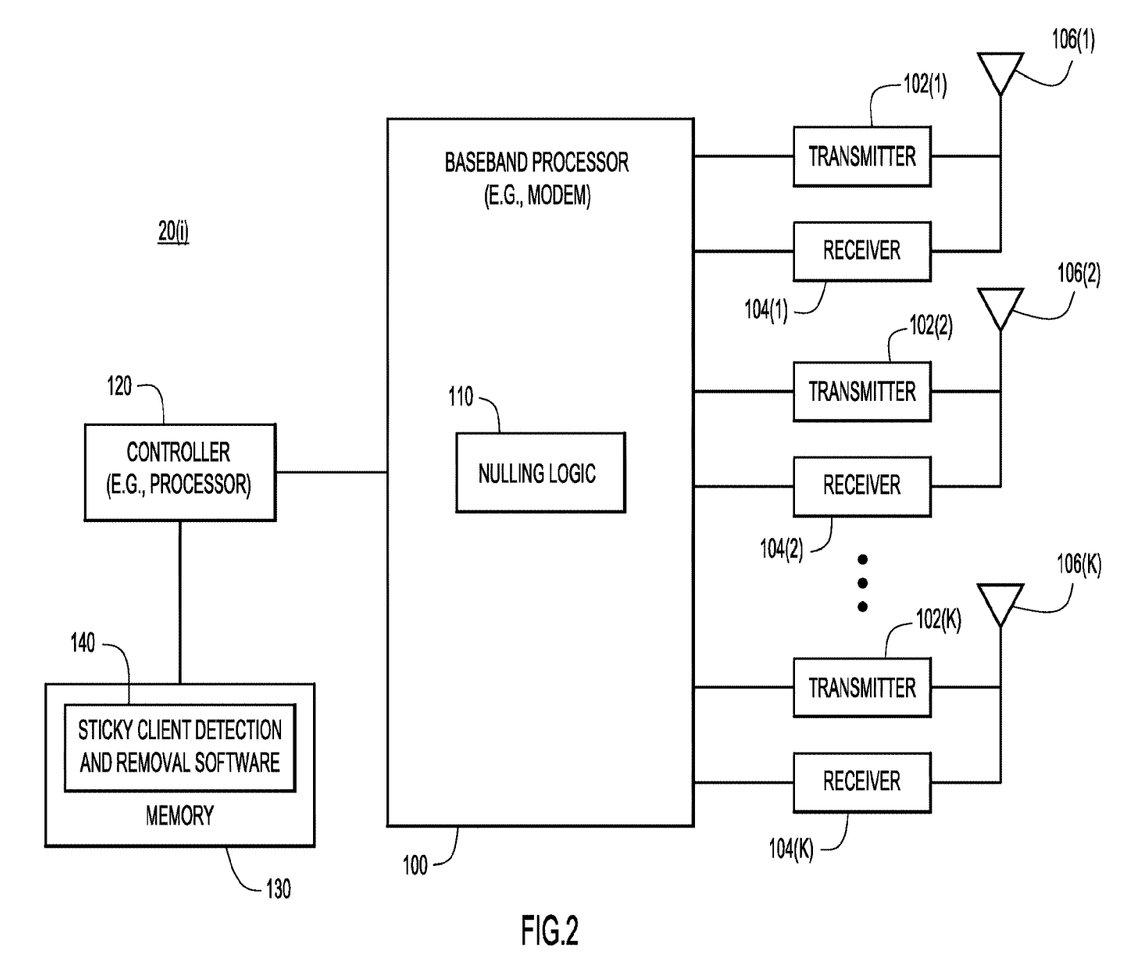
FIG. 2 is a block diagram of a wireless access point device configured to perform one or more methods to provoke a wireless client device to transition to a different wireless access point.

Reference is now made to FIG. 2 that shows a block diagram of an AP that is capable of performing the methods presented herein to remove a sticky client from an AP. The AP shown in FIG. 2 is identified generally by reference numeral 20(i) and is representative of any of the APs shown in FIG. 1.

The AP 20(i) includes a baseband processor (e.g., modem) 100, a plurality of transmitters 102(1)-102(K), a plurality of receivers 104(1)-104(K), a plurality of antennas 106(1)-106 (K), a controller 120 and a memory 130. Each transmitter 102(1)-102(K) is connected to a corresponding one of the plurality of antennas 106(1)-106(K), and likewise each receiver 104(1)-104(K) is connected to a corresponding one of the plurality of antennas 106(1)-106(K). The baseband processor 100 includes nulling logic 110 that is used to send a transmission with nulling parameters, as described further herein. That is, the nulling logic 110 may be used to send a transmission with antenna-weighting (spatial nulling) parameters to reduce the SNR at one or more client devices for signals transmitted by the AP. The baseband processor 100 may be implemented by fixed or programmable digital logic gates, such as in the form of an application specific integrated circuit (ASIC), or may be implemented by a dedicated digital signal processor, microprocessor or microcontroller. The nulling logic 110 is only one of several functional blocks of the baseband processor 100, and again, it may be implemented by digital logic gates or by instructions executed by a microprocessor.

The controller 120 is coupled to the baseband processor 100 and provides higher level control for the AP 20(i). The controller 120 may be a microprocessor or microcontroller. The memory 130 stores instructions that the controller 120 executes to perform the control functions of the AP 20(i). Among these functions are operations performed when the controller 120 executes the sticky client detection and removal software 140 stored in memory 130.

The memory 130 may comprise read only memory (ROM), random access memory (RAM), magnetic disk storage media devices, optical storage media devices, flash memory devices, electrical, optical, or other physical/tangible memory storage devices. Thus, in general, the memory 130 may comprise one or more tangible (non-transitory) computer readable storage media (e.g., a memory device) encoded with software comprising computer executable instructions and when the software is executed (by the controller 120) it is operable to perform the operations described herein.

Figure 3:
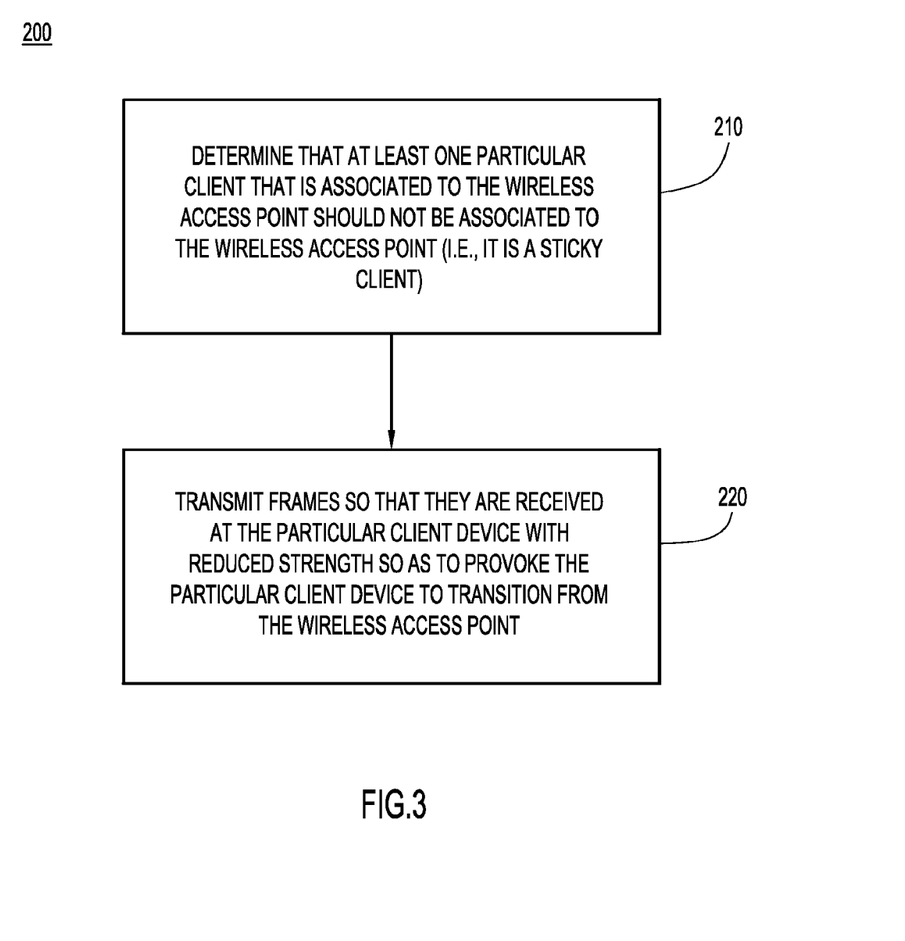
FIG. 3 is a flow chart generally depicting operations performed by a wireless access point to transition a client device to a different wireless access point.
Figure 4:
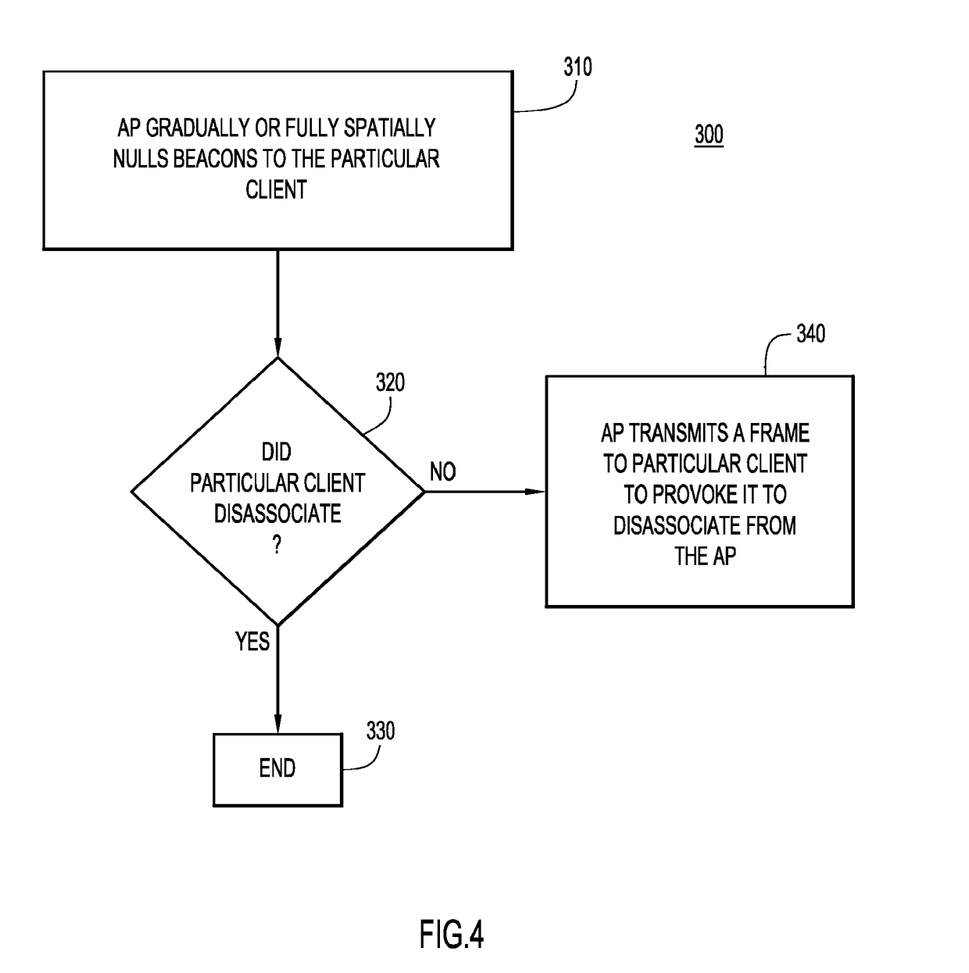
FIG. 4 is a flow chart depicting operations for a first method performed by a wireless access point to transition a client device to a different wireless access point.
Figure 5:
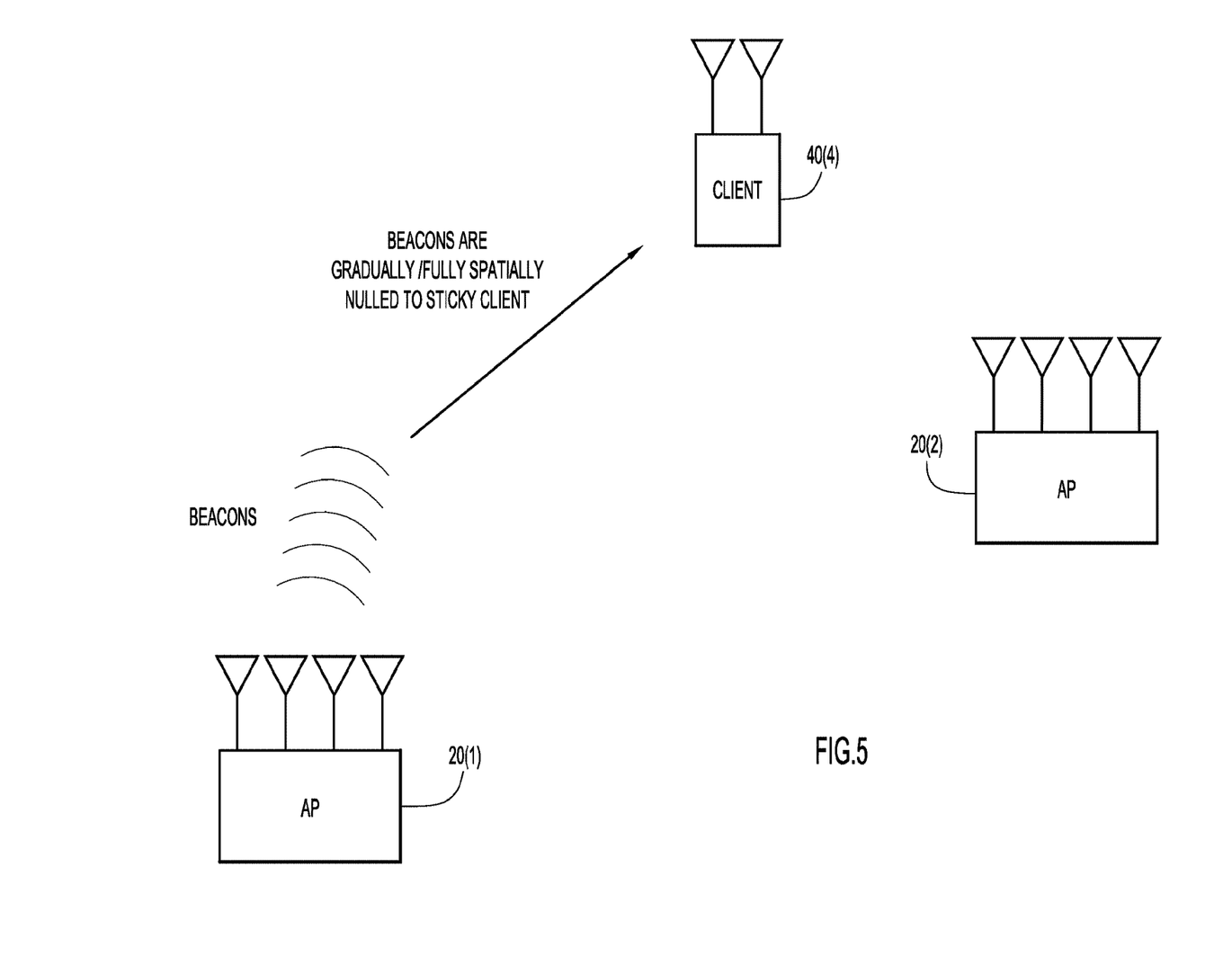
FIG. 5. is a block diagram depicting the first method.
Figure 8:
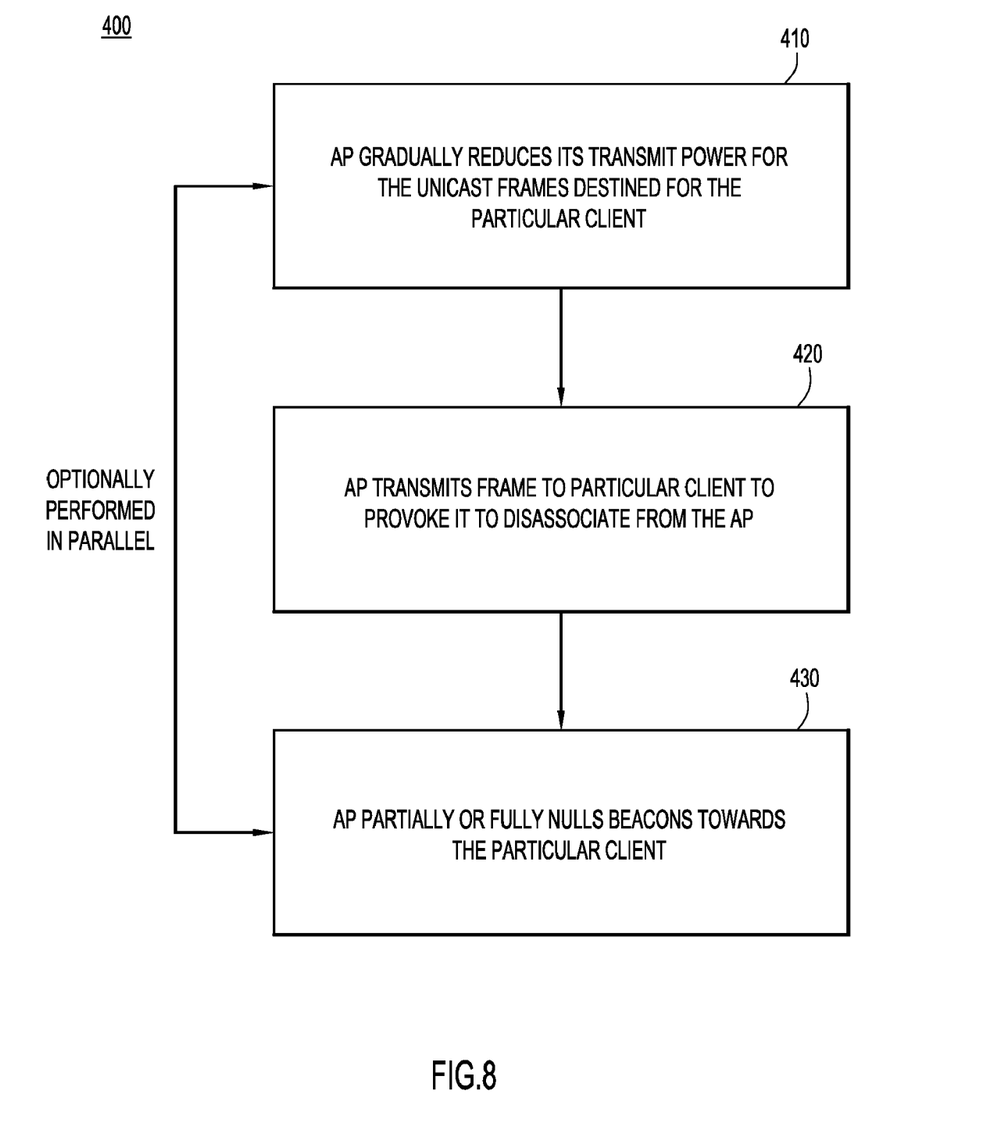
FIG. 8 is a flow chart depicting operations for a second method performed by a wireless access point to transition a client device to a different wireless access point.
Figure 9:
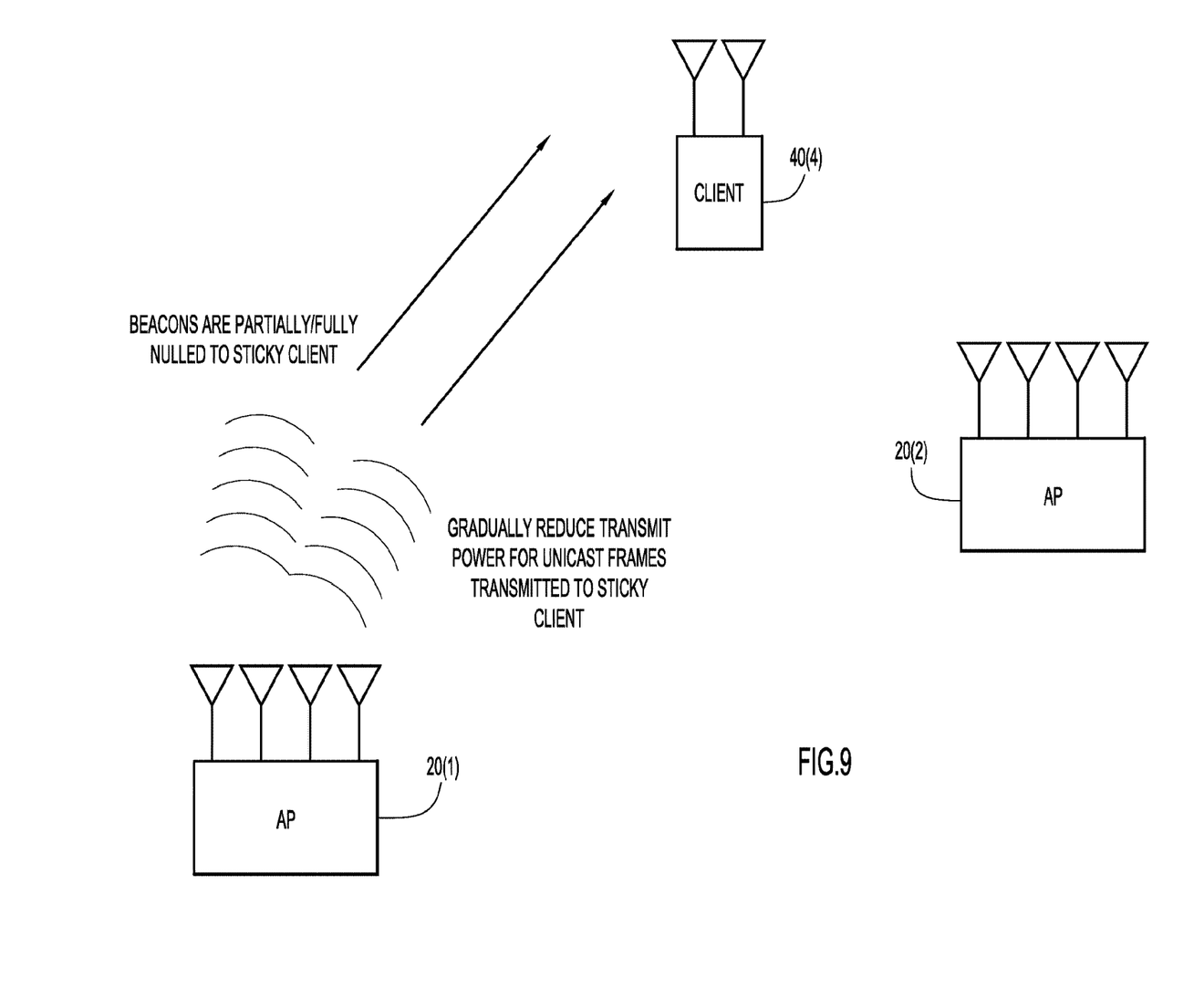
FIG. 9 is a block diagram depicting the second method.
Figure 10:
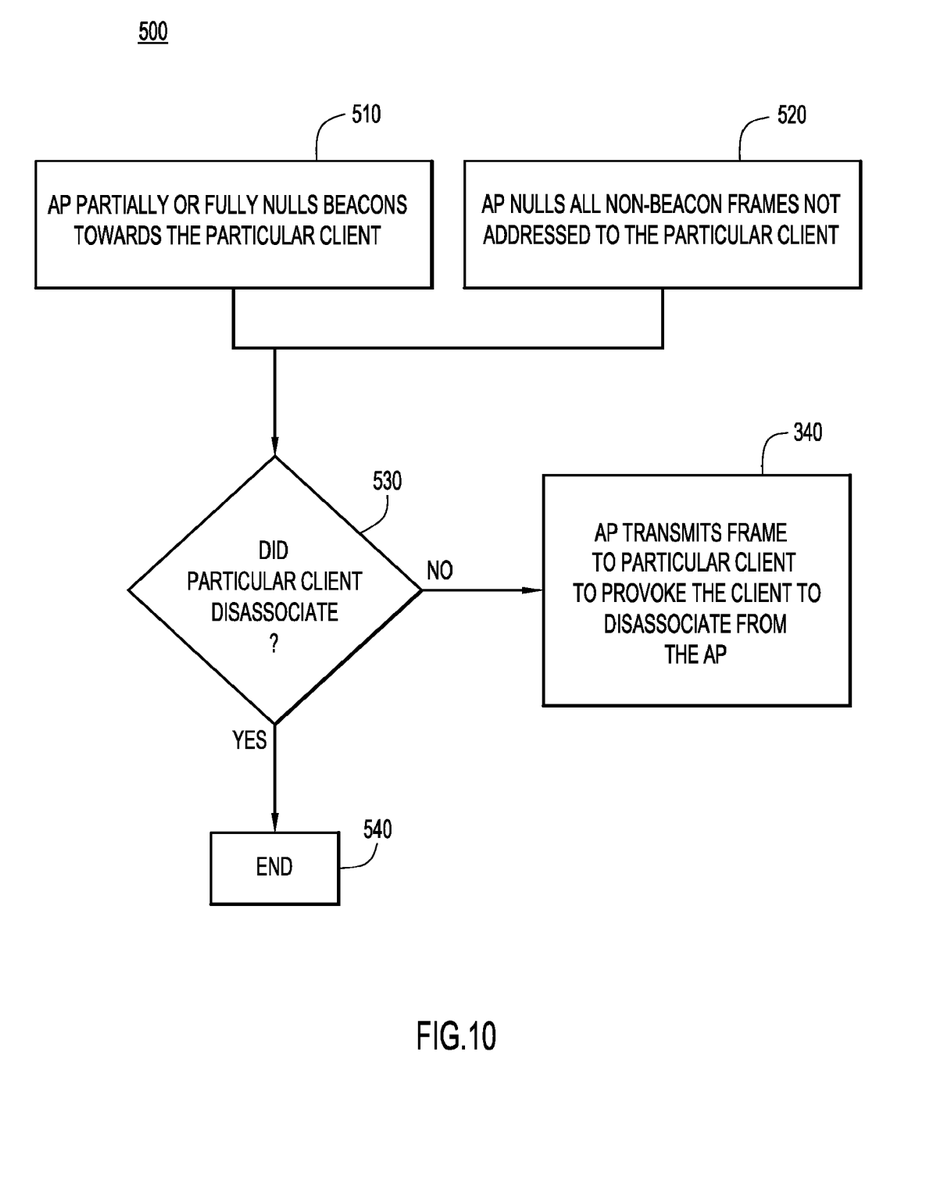
FIG. 10 is a flow chart depicting operations for a third method performed by a wireless access point to transition a client device to a different wireless access point.
Figure 11:
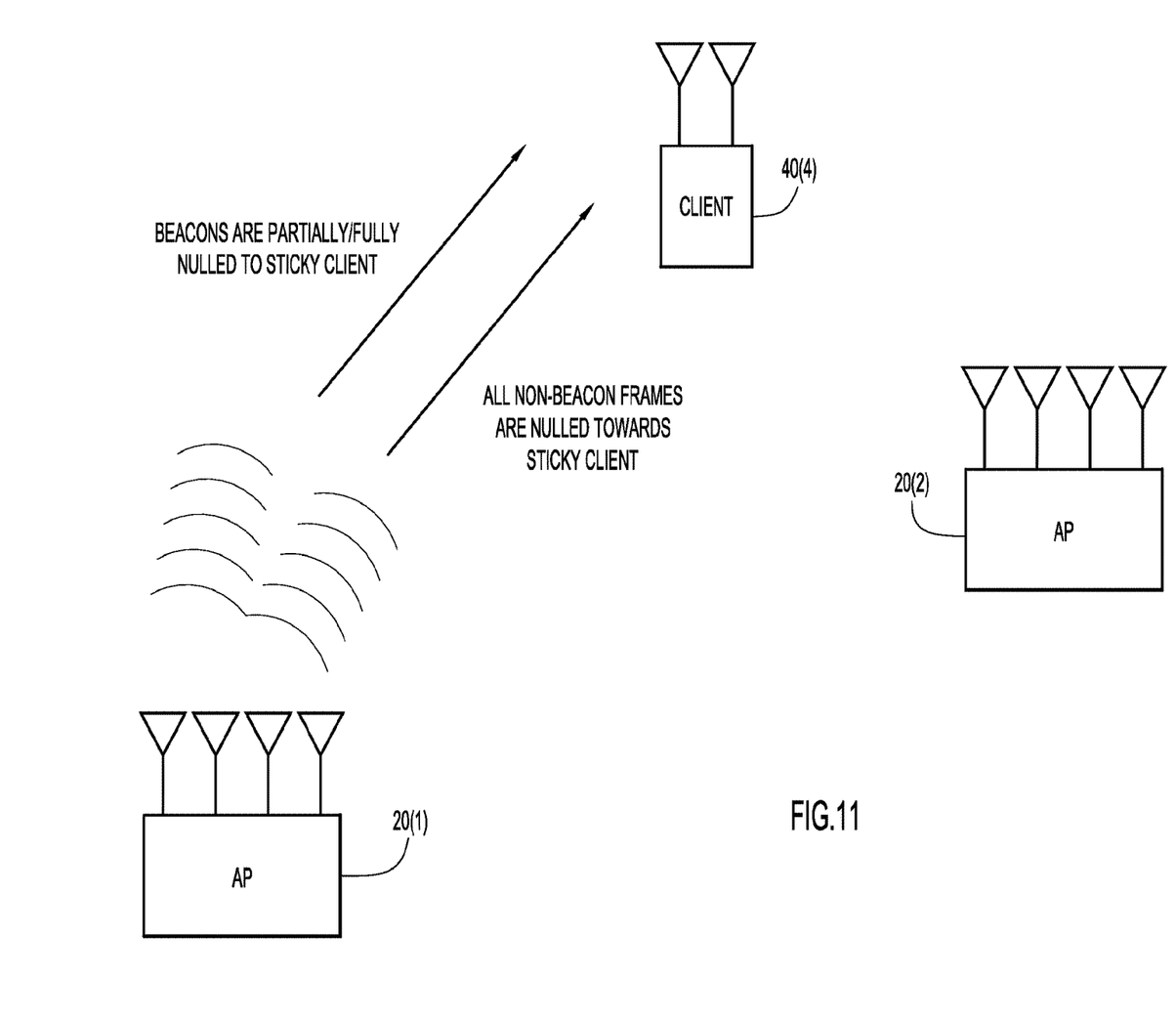
FIG. 11 is a block diagram depicting the third method.

Turning now to FIG. 3, a flow chart is shown for a method 200. At 210, the AP determines that at least one particular client that is associated to the AP should not be associated to the wireless access point, that is, the particular client is a sticky client. There are many ways to detect/determine that a client is a "sticky" client. One technique is for the AP to observe a weak signal from a client for a period of time. At 220, the AP transmits frames so that they are received at the particular client device with reduced strength so as to provoke the particular client device to transition from the AP. Several techniques for transmitting frames are described hereinafter in connection with FIGS. 4-11. In particular, FIGS. 4 and 5 illustrate a first method, FIGS. 8 and 9 illustrate a second method and FIGS. 10 and 11 illustrate a third method. In one embodiment, the AP may start with the first method, and if the client does not roam, then perform the second method, and then if the client still does not roam, then perform the third method. The third method is the most intrusive of the three methods and therefore is performed as a last resort. However, each method on its own has merit as well, and thus each method may be separately performed.

As will become apparent from the following, beacons as defined in the IEEE 802.11 standard play a role in controlling whether a client attempts to roam to a new AP because clients evaluate the receive power (RSSI) and/or the receive SNR) of beacons transmitted by its serving AP. Some clients exclusively rely on the beacon to "evaluate the AP", and base their behavior (roaming etc.) solely based on receive characteristics of beacons, while other clients use the beacon to assess the AP presence, but may also derive their roaming or rate shifting behavior from additional elements, such as unicast/multicast/broadcast frames. In general, the goal of the methods presented herein is for the sticky client to receive a beacon, possibly along with other unicast, multicast, or broadcast frames, at a lower power than other clients associated to that AP, so that the sticky client determines the AP is far away and therefore the sticky client attempts to transition to and associate with another AP.

Referring now to FIGS. 4 and 5, the first method 300 is now described. For this method, the visibility of the AP's beacons is gradually reduced for the sticky client for a period of time, and the AP eventually disassociates and maintains invisibility to the sticky client. At 310, AP gradually or fully nulls broadcast frames to the particular client. The nulling operation is performed by way of execution of the nulling logic 110 of the AP (FIG. 2). As used herein the term "null" or "nulling" is meant to refer to spatially nulling achieved by applying appropriate antenna weights to a signal to be transmitted across a plurality of antennas of the AP.

FIG. 5 shows an example in which AP 20(1) transmits beacons with nulling parameters to gradually or fully null the beacons (for a number of beacon intervals) towards the sticky client 40(4). The number of beacon intervals over which the gradual or full nulling is performed is based on determining that the client effectively disassociates from the AP 20(1). Further details on the nulling operation are described hereinafter in connection with FIGS. 6 and 7. The nulling of beacons may include initially transmitting beacons with nulling parameters to partially null beacons towards the particular client device and gradually adjusting the nulling parameters over time to increase nulling of beacons towards the particular client device. Partially nulling beacons towards the particular client device may involve applying nulling parameters (using antenna weights) that project a transmitted signal (the beacon) on a space at a projection angle that is less than 90 degrees with respect to a direction of a dominant eigenvector of the particular client device. Gradually adjusting the nulling parameters may involve adjusting the nulling parameters to increase the projection angle towards 90 degrees with respect to a direction of the dominant eigenvector of the particular client device.

Alternatively, the nulling may involve fully nulling the beacons towards the particular client for the entirety of a number of beacon intervals. In other words, fully nulling may involve using nulling parameters (antenna weights) that achieve a projection angle substantially equal to 90 degrees with respect to the direction of the dominant eigenvector of the particular client device.

At 320, the AP determines whether the particular client (the sticky client) has disassociated from the AP. At 330, the process ends if the AP determines that the particular client has disassociated from the AP. Otherwise, at 340, if the particular client is still associated to the AP, then the AP transmits a frame to provoke the particular client to disassociate from the AP. The frame transmitted at 340 may be a disassociation frame or a de-authentication frame. In either case, when the client receives the frame transmitted at 340, it will no longer be associated to the AP. Moreover, at 340, the AP may maintain invisibility to the client. This may be achieved by not acknowledging any frame from the client, and not responding to any frame (including probe requests) from the client.

As an example, in a 4×4 multiple-input multiple-output (MIMO) channel, nulling can be achieved by transmitting along the weakest eigenvector of the 4×4 channel. When the intended recipient is a client with one antenna, it is possible to effectively null towards the client since it has only one eigenvector. Even if the client has two antennas, for the transmission/reception of management and control frames only one antenna (one spatial stream, SS=1) is used and the AP performs nulling toward that one antenna, which in fact is the same antenna for which the AP has obtained the client's channel state information, through an acknowledgement (ACK) frame or other uplink frames transmitted by the client.

Nulling is not location specific, rather it is more client specific. Nulling works in a radio frequency (RF) mathematical domain. It may impact other non-targeted clients, but statistically that impact on other clients will be minimal. Moreover, the AP can, in advance of performing the nulling operation, determine how correlated the RF channels are for multiple clients. This is an attribute of the environment and can be determined by the AP (or re-determined as necessary to take into account the changes in the RF environment (in a given venue). The AP can cross-correlate the channels of a selected number of clients and conclude whether or not the environment is highly correlated by comparing the cross-correlation to a threshold value. If the AP determines that the environment is highly correlated then it would avoid performing the nulling operation and instead resort to a power-altering method, which is the second method referred to above, and described hereinafter in connection with FIGS. 8 and 9.

Figure 6:
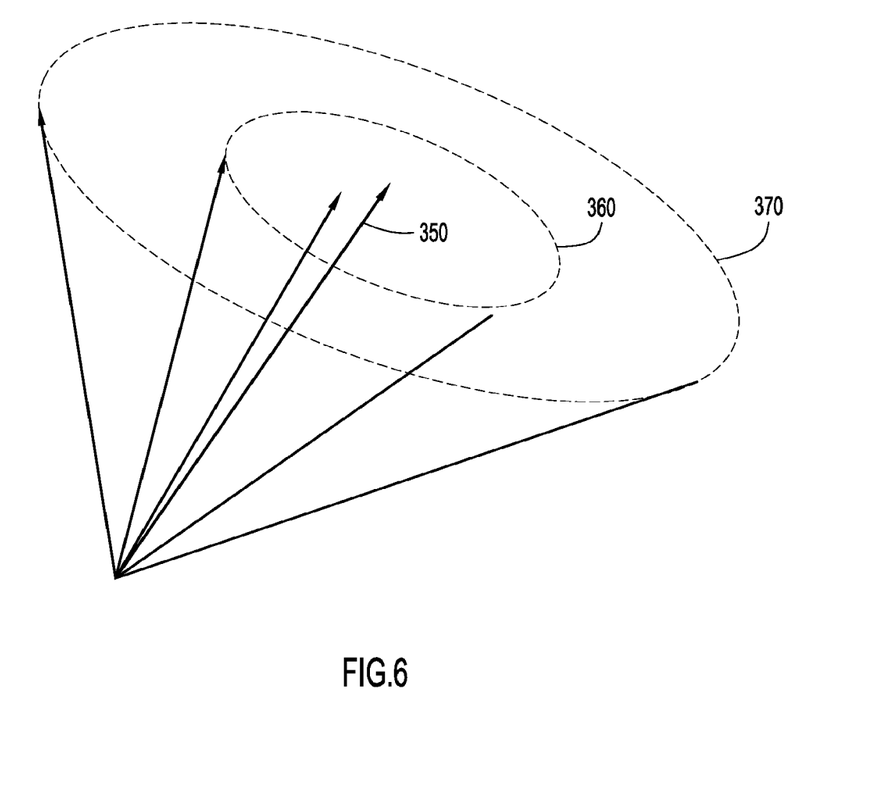
FIG. 6 is a diagram depicting the spatial nulling operations performed by a wireless access point in accordance with any of the methods presented herein.
Figure 7:
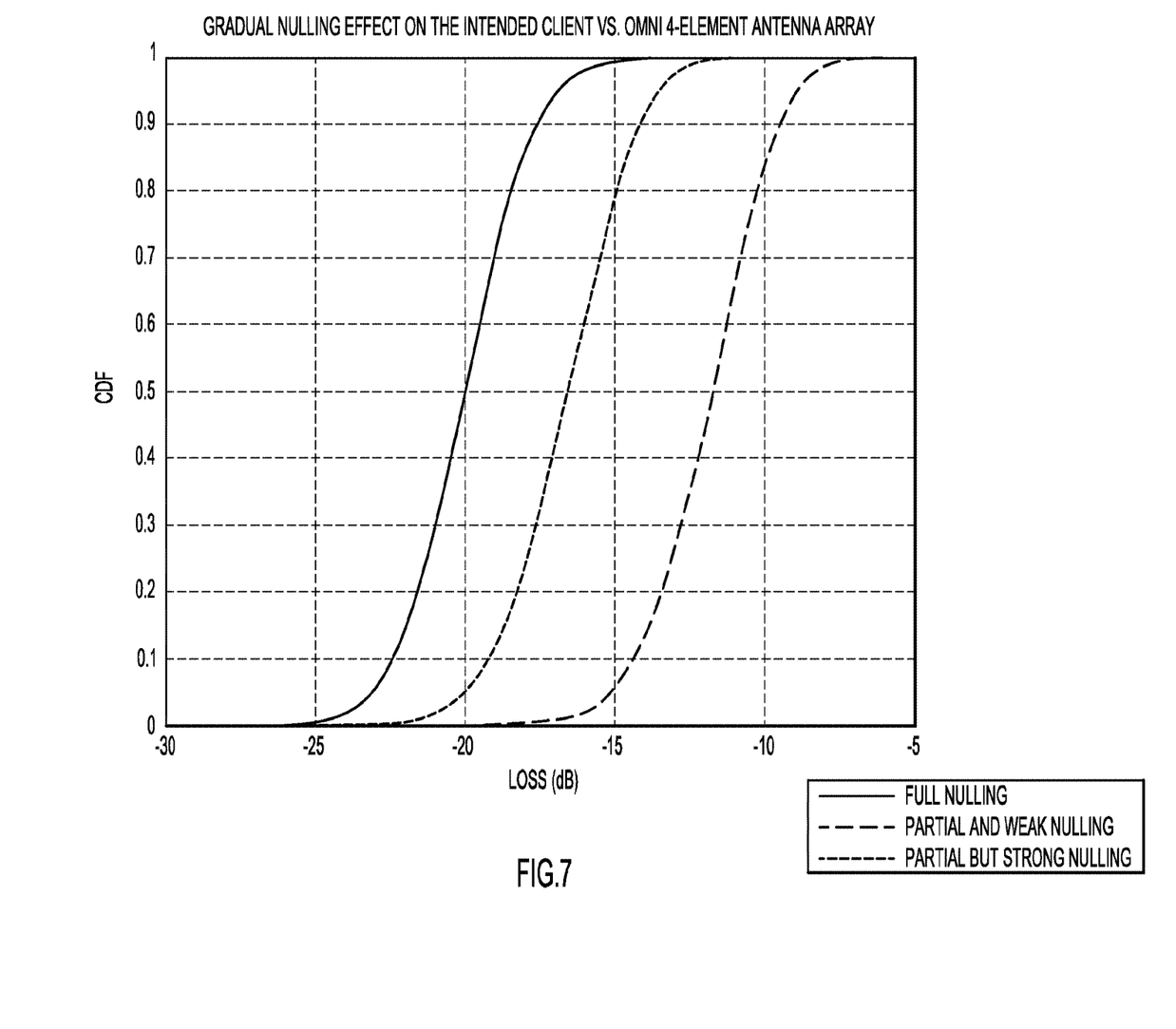
FIG. 7 is a diagram showing plots of simulation results for the spatial nulling operations.

Reference is now made to FIGS. 6 and 7 for further details on the nulling technique. The AP first obtains the RF signature or Channel State Information (CSI) of the particular target/sticky client. The AP regularly updates the CSI for purposes of updating beamforming weights to the client, and this CSI can be used for generating nulling parameters without additional processing. The source of the CSI are the uplink frames that the client sends, such as data, management or control frames, as described above.

For full nulling, the AP aims at the estimated CSI and nulls toward this direction. For partial nulling, the AP selects a vector that is not fully aligned with the estimated CSI, and has a given angle. All the vectors that fall on the surface of a cone, whose axis is the estimated CSI vector, qualify for partial nulling. In FIG. 6, this is shown as (half-drawn) cones where the estimated CSI is the axis of the cone as shown by the vector at reference numeral 350, and the vectors with given angles fall on the surface of the cone. FIG. 6 shows two cones. Cone 360 based on a vector selected that achieves partial yet strong nulling since it is within a closer neighborhood with respect to the estimated CSI vector 350. Cone 370 is based a vector selected that causes partial and weaker nulling since it is farther from the estimated CSI vector 350.

One with ordinary skill in the art would understand that selecting a vector on the surface of a cone is mathematically equivalent to rotating the vector 350 by a given rotation matrix (a rotation matrix, corresponding to a set of antennas weights, that fits the dimension of the antenna array of the AP).

FIG. 7 shows simulation results for nulling applied according to the above description. The antenna array is of size 4 in this simulation. For the purpose of this simulation, four-dimensional rotation matrices according to this reference are selected. The plots in FIG. 7 show the ability of an AP to control the amount of nulling loss by the selection of the rotation matrix.

Reference is now made to FIGS. 8 and 9 for a description of the second method. FIG. 8 shows a flow chart for method 400, and FIG. 9 graphically illustrates this method. In this method, the AP gradually reduces power of unicast frames to the sticky client so that the client disassociates, and then the AP becomes practically invisible to the client for a period of time (the AP signal may still reach the client to some degree). At 410, the AP gradually reduces transmit power for unicast frames destined for the particular client device. The time to start this phase is chosen so that there would not be many/any broadcast frames during this time. The amount of transmit power reduction is chosen so that the client would still acknowledge the frame, to avoid the need for the AP to retransmit several times to obtain acknowledgement. At 420, the AP transmits a frame to the particular client to cause it to disassociate from the AP. This frame may be a disassociation frame or a de-authentication frame, and it is sent with normal transmit power. At 430, the AP transmits beacons with nulling parameters to partially or fully null the beacons towards the particular client. In one form, operations 410 and 430 may be performed in parallel (at the same time) and operation 420 performed thereafter. Method 400 targets those clients that use RSSI of beacons and unicast frames that are addressed to the client for triggering roaming of the client.

Reference is now made to FIGS. 10 and 11 to describe the third method. FIG. 10 illustrates a flow chart for this method shown at reference numeral 500. FIG. 11 graphically illustrates method 500. This method is the most intrusive, and in general it is used as a last resort because the goal is for the AP to become "invisible" to the client for all transmissions. At 510, the AP partially or fully nulls beacons towards the particular client. At 520, for all other non-beacon frames (unicast frames, multicast frames, beacon, broadcast frames, etc.), the AP nulls those frames towards the particular client. At 530, the AP determines whether the particular client has disassociated from the AP. If it did, then the method 500 ends at 540. Otherwise, at 550, the AP transmits a frame to provoke the particular client to disassociate from the AP, and maintains invisibility from the particular client. Method 500 targets those clients that use RSSI of any frame that originates from the associated AP for triggering the roaming process. The beamforming capability of the AP becomes limited during the nulling period, however this is for a relatively short period of time (several beacon periods).

The length of a nulling period used in the above methods is chosen such that: (a) the sticky client notices absence of the beacon of the associated AP for T1 Target Beacon Transmission Time (TBTT) intervals and starts a beacon search procedure, plus (b) the length of a scan interval, T2 TBTT intervals. T1 varies for different vendors, and in this algorithm a maximum of known T1 values is considered. T2 may be different for 2.4 GHz and 5 GHz bands, if the number of scanned channels is different.

To summarize, the techniques presented herein use nulling methods for frames to provoke the client to take an action, such as scanning other channels, or probing etc. In particular, beacon frames are transmitted so that they are received with lower power for several TBTT periods so that the intended client seeks association with surrounding APs that have a stronger signal level (RSSI) and/or received SNR (i.e., better channel quality) for that client.

The nulling schemes presented herein generally are intended to address one sticky client at a time. It is unlikely that there would be several sticky clients requiring disassociation at a given time in a BSS, and even if there are several sticky clients, the AP would target each sticky client, one at a time, for several Beacon intervals, and then address the next sticky client.

The use of all three methods described above may be coordinated in such a manner that AP transmits beacons with nulling parameters to null the beacons towards the particular client device for one or more beacon intervals. If the particular client device has not transitioned from the wireless access point after one or more beacon intervals, then unicast frames destined for the particular client device are transmitted with gradually reduced power over a period of time. If the particular client device has not transitioned from the wireless access point after the period of time, then all non-beacon frames, which are not addressed to the particular client device, are transmitted with nulling parameters to null the non-beacon frames towards the particular client device.

In summary, in one form, a method is provided comprising: at a wireless access point that serves one or more wireless client devices in a wireless network: determining that at least one particular client device that is associated to the wireless access point should not be associated to the wireless access point; and transmitting frames so that they are received at the particular client device with reduced strength so as to provoke the particular client device to transition from the wireless access point.

In another form, a wireless access point is provided comprising: a plurality of transmitters, each associated with a corresponding one of a plurality of antennas; a plurality of receivers, each associated with a corresponding one of the plurality of antennas; and a baseband processor coupled to the plurality of transmitters and the plurality of receivers, wherein the baseband processor: determines that a particular client device that is associated to the wireless access point should not be associated to the wireless access point; and causes frames to be transmitted via the plurality of antennas so that they are received at the particular client device with reduced strength so as to provoke the particular client device to transition from the wireless access point.

Further, non-transitory computer readable storage media encoded with instructions that, when executed by a processor, cause the processor to perform operations for a wireless access point that serves one or more wireless client devices in a wireless network, the operations comprising: determining that at least one particular client device that is associated to the wireless access point should not be associated to the wireless access point; and causing frames to be transmitted so that they are received at the particular client device with reduced strength so as to provoke the particular client device to transition from the wireless access point.

The above description is intended by way of example only. Various modifications and structural changes may be made therein without departing from the scope of the concepts described herein and within the scope and range of equivalents of the claims.

What is claimed is:

1. A method comprising:
   at a wireless access point:
      determining that a client device associated to the wireless access point should no longer be associated to the wireless access point; and
      in response to determining that the client device should no longer be associated to the wireless access point, provoking the client device to transition from the wireless access point by transmitting a series of frames such that each subsequent frame in the series of frames is received at the client device with a strength that is reduced relative to a previous frame in the series of frames.

2. The method of claim 1, wherein provoking the client device to transition from the wireless access point includes transmitting a series of beacons such that each subsequent beacon in the series of beacons is transmitted with nulling parameters to increase nulling towards the client device relative to a previous beacon in the series of beacons.

3. The method of claim 1, wherein provoking the client device to transition from the wireless access point includes transmitting a series of unicast frames destined for the client device such that each subsequent unicast frame in the series of unicast frames is transmitted with reduced power relative to a previous unicast frame in the series of unicast frames.

4. The method of claim 3, further comprising determining a time to initiate transmitting the series of unicast frames so that there are few or no broadcast frames while the series of unicast frames is transmitted.

5. The method of claim 1, wherein determining that the client device should no longer be associated to the wireless access point includes determining that there is another wireless access point that would provide higher link quality to the client device than the wireless access point.

6. The method of claim 1, further comprising transmitting non-beacon frames that are not addressed to the client device with nulling parameters to null the non-beacon frames towards the client device.

7. The method of claim 1, further comprising:
   after provoking the client device to transition from the wireless access point, determining whether the client device has transitioned from the wireless access point; and
   if it is determined that the client device has not transitioned from the wireless access point, transmitting a frame to the client device to provoke the client device to disassociate from the wireless access point.

8. A wireless access point comprising:
   a plurality of transmitters, each associated with a corresponding one of a plurality of antennas;
   a plurality of receivers, each associated with a corresponding one of the plurality of antennas; and
   a baseband processor coupled to the plurality of transmitters and the plurality of receivers, wherein the baseband processor:
      determines that a client device associated to the wireless access point should no longer be associated to the wireless access point; and
      in response to determining that the client device should no longer be associated to the wireless access point, provokes the client device to transition from the wireless access point by transmitting a series of frames such that each subsequent frame in the series of frames is received at the client device with a strength that is reduced relative to a previous frame in the series of frames.

9. The wireless access point of claim 8, wherein the baseband processor provokes the client device to transition from the wireless access point by transmitting a series of beacons such that each subsequent beacon in the series of beacons is transmitted with nulling parameters to increase nulling towards the client device relative to a previous beacon in the series of beacons.

10. The wireless access point of claim 8, wherein the baseband processor provokes the client device to transition from the wireless access point by transmitting a series of unicast frames destined for the client device such that each subsequent unicast frame in the series of unicast frames is transmitted with reduced power relative to a previous unicast frame in the series of unicast frames.

11. The wireless access point of claim 10, wherein the baseband processor further determines a time to initiate transmitting the series of unicast frames so that there are few or no broadcast frames while the series of unicast frames is transmitted.

12. The wireless access point of claim 8, wherein the baseband processor determines that the client device should no longer be associated to the wireless access point by determining that there is another wireless access point that would provide higher link quality to the client device than the wireless access point.

13. The wireless access point of claim 8, wherein the baseband processor further transmits non-beacon frames that are not addressed to the client device with nulling parameters to null the non-beacon frames towards the client device.

14. The wireless access point of claim 8, wherein the baseband processor further:
after provoking the client device to transition from the wireless access point, determines whether the client device has transitioned from the wireless access point; and
if it is determined that the client device has not transitioned from the wireless access point, transmits a frame to the client device to provoke the client device to disassociate from the wireless access point.

15. A non-transitory computer readable storage media encoded with instructions that, when executed by a processor, cause the processor to perform operations for a wireless access point, the operations comprising:
determining that a client device associated to the wireless access point should no longer be associated to the wireless access point; and
in response to determining that the client device should no longer be associated to the wireless access point, provoking the client device to transition from the wireless access point by transmitting a series of frames such that each subsequent frame in the series of frames is received at the client device with a strength that is reduced relative to a previous frame in the series of frames.

16. The non-transitory computer readable storage media of claim 15, wherein provoking the client device to transition from the wireless access point includes transmitting a series of beacons such that each subsequent beacon in the series of beacons is transmitted with nulling parameters to increase nulling towards the client device relative to a previous beacon in the series of beacons.

17. The non-transitory computer readable storage media of claim 15, wherein provoking the client device to transition from the wireless access point includes transmitting a series of unicast frames destined for the client device such that each subsequent unicast frame in the series of unicast frames is transmitted with reduced power relative to a previous unicast frame in the series of unicast frames.

18. The non-transitory computer readable storage media of claim 15, wherein determining that the client device should no longer be associated to the wireless access point includes determining that there is another wireless access point that would provide higher link quality to the client device than the wireless access point.

19. The non-transitory computer readable storage media of claim 15, wherein the instructions further cause the processor to perform operations comprising:
transmitting non-beacon frames that are not addressed to the client device with nulling parameters to null the non-beacon frames towards the client device.

20. The non-transitory computer readable storage media of claim 15, wherein the instructions further cause the processor to perform operations comprising:
after provoking the client device to transition from the wireless access point, determining whether the client device has transitioned from the wireless access point; and
if it is determined that the client device has not transitioned from the wireless access point, transmitting a frame to the client device to provoke the client device to disassociate from the wireless access point.

* * * * *